United States Patent
Zweig et al.

(10) Patent No.: US 11,907,298 B2
(45) Date of Patent: Feb. 20, 2024

(54) SYSTEM AND METHOD THEREOF FOR AUTOMATICALLY UPDATING A DECISION-MAKING MODEL OF AN ELECTRONIC SOCIAL AGENT BY ACTIVELY COLLECTING AT LEAST A USER RESPONSE

(71) Applicant: Intuition Robotics, Ltd., Ramat-Gan (IL)

(72) Inventors: Shay Zweig, Harel (IL); Eldar Ron, Tel Aviv (IL); Alex Keagel, Tel Aviv (IL); Itai Mendelsohn, Tel Aviv (IL); Roy Amir, Mikhmoret (IL); Dor Skuler, Oranit (IL)

(73) Assignee: INTUITION ROBOTICS, LTD., Ramat-Gan (IL)

( * ) Notice: Subject to any disclaimer, the term of this patent is extended or adjusted under 35 U.S.C. 154(b) by 99 days.

(21) Appl. No.: 17/166,535

(22) Filed: Feb. 3, 2021

(65) Prior Publication Data
US 2021/0240777 A1    Aug. 5, 2021

Related U.S. Application Data

(60) Provisional application No. 62/969,820, filed on Feb. 4, 2020.

(51) Int. Cl.
*G06F 16/9032* (2019.01)
*G06F 16/9535* (2019.01)
(Continued)

(52) U.S. Cl.
CPC .... *G06F 16/90332* (2019.01); *G06F 16/9535* (2019.01); *G06N 20/00* (2019.01); *G10L 15/22* (2013.01); *G10L 2015/228* (2013.01)

(58) Field of Classification Search
CPC ........... G06F 16/90332; G06F 16/9535; G10L 15/22; G10L 2015/228; G06N 3/006; G06N 20/00
See application file for complete search history.

(56) References Cited

U.S. PATENT DOCUMENTS 6,782,375 B2 * 8/2004 Abdel-Moneim ....... G06N 3/02
706/15
8,290,768 B1 * 10/2012 Nelken ............... H04M 3/5141
707/706

(Continued)

FOREIGN PATENT DOCUMENTS

CA    2397192 A1 *  8/2001  ......... G06Q 10/1093
EP    2568420 A2 *  3/2013  ............. G06N 5/025

(Continued)

*Primary Examiner* — Daniel C Washburn
*Assistant Examiner* — Oluwadamilola M Ogunbiyi
(74) *Attorney, Agent, or Firm* — M&B IP Analysts, LLC

(57) ABSTRACT

According to some disclosed embodiments an action is performed by an electronic social agent. The electronic social agent collects a first dataset indicating the user's state, the user's environment state, and a first user response to the performed action. Then, it is determined whether it is desirable to collect a second response from the user and, if so, it is further determined whether to generate a question to be presented to the user based on an analysis of a first dataset and the first user response. Then, an optimal time for presenting the question to the user is determined. A question that is based on the collected data and the first user response is generated by the electronic social agent for actively collecting an additional user response. Then, based on the collected additional user response, the decision-making model of the electronic social agent is updated and improved.

18 Claims, 3 Drawing Sheets

(51) Int. Cl.
*G06N 20/00* (2019.01)
*G10L 15/22* (2006.01)

(56) References Cited

U.S. PATENT DOCUMENTS

| | | | | |
|---|---|---|---|---|
| 2005/0216421 | A1* | 9/2005 | Barry | H04L 63/0428 |
| | | | | 705/64 |
| 2015/0172262 | A1* | 6/2015 | Ortiz, Jr. | H04W 12/068 |
| | | | | 715/706 |
| 2016/0170998 | A1* | 6/2016 | Frank | G06F 16/9535 |
| | | | | 707/748 |
| 2016/0342317 | A1* | 11/2016 | Lim | G10L 15/1822 |
| 2017/0213139 | A1* | 7/2017 | Sawant | G06N 5/043 |
| 2017/0221081 | A1* | 8/2017 | Ollikainen | G06F 16/122 |
| 2017/0277693 | A1* | 9/2017 | Mehedy | G06N 20/00 |
| 2019/0034813 | A1* | 1/2019 | Das | G06N 5/022 |
| 2019/0205727 | A1* | 7/2019 | Lin | G06N 5/00 |
| 2019/0295537 | A1* | 9/2019 | Sapugay | G06N 20/00 |
| 2020/0092293 | A1* | 3/2020 | Liu | G06Q 40/02 |
| 2020/0186482 | A1* | 6/2020 | Johnson, III | H04L 12/1818 |
| 2020/0341987 | A1* | 10/2020 | Wright | G06N 20/00 |
| 2020/0402630 | A1* | 12/2020 | Sudharsan | G16H 20/10 |
| 2021/0064033 | A1* | 3/2021 | Telpaz | B60W 50/06 |
| 2021/0089860 | A1* | 3/2021 | Heere | G06N 20/00 |
| 2021/0104100 | A1* | 4/2021 | Whitney | G02B 27/0172 |

FOREIGN PATENT DOCUMENTS

| | | | | |
|---|---|---|---|---|
| GB | 2579231 A | * | 6/2020 | G06Q 10/1093 |
| JP | 2018511095 A | * | 4/2018 | G06N 5/025 |
| KR | 20160146150 A | * | 12/2016 | G06F 21/6245 |
| TW | 538390 B | * | 6/2003 | G09B 7/00 |
| WO | WO-2017100334 A1 | * | 6/2017 | G06F 3/017 |
| WO | WO-2021041239 A1 | * | 3/2021 | G06N 20/00 |

\* cited by examiner

SYSTEM AND METHOD THEREOF FOR AUTOMATICALLY UPDATING A DECISION-MAKING MODEL OF AN ELECTRONIC SOCIAL AGENT BY ACTIVELY COLLECTING AT LEAST A USER RESPONSE

CROSS-REFERENCE TO RELATED APPLICATIONS

This application claims the benefit of U.S. Provisional Application No. 62/969,820 filed on Feb. 4, 2020, the contents of which are hereby incorporated by reference.

TECHNICAL FIELD

The present disclosure relates generally to reinforcement learning processes, and more specifically, to a system and method for automatically updating a decision-making model of an electronic social agent by actively collecting at least a user response.

BACKGROUND

As smart devices, such as computers, cell phones, home appliances, industrial machines, and the like, grow in popularity, manufacturers of such devices may seek to improve the experience a user has in interacting with such devices. One such improvement to the user experience includes the integration of electronic social agents into such devices. Electronic social agents are software systems which provide for simplification of the user experience by enabling features such as voice control, per-user personalization, and the like. Certain electronic social agents may be configured to include customization features, allowing a user to, by updating the agent, or through repeated interactions with the agent, create a personalized social agent profile. A personalized social agent profile allows a user to customize various features of an agent to suit the user's preferences, in addition to the device functionalities already enabled by the agent.

Certain electronic social agents, such as Apple's Siri®, include features which allow a user to customize, to an extent, various interactions with the agent. As an example, an agent may be configured to learn a user's name, such as by accepting a user's command which specifies that the agent call the user by the user's name. Further, currently-available social agents may be configured to provide adaptive customization, such as by suggesting recommended device functions based on context details and a user's history, such as by automatically recommending that the user open an email application when the time is noon and when the user has regularly opened the email application at noon.

While currently-available social agents may include adaptive functionalities, as described, such currently-available agents may fail to provide for enhanced adaptive customization. As agent customization may include customization of the agent to respond to changes in both the user's state and the user's environment's state, electronic social agents which can detect such changes and respond adaptively may be desirable. However, currently available solutions may fail to provide for adjusting agent customization functions based on user and environment data. As a result, currently-available solutions may provide for customization of an agent, or agent self-customization, such as by an automated process, while failing to account for user and environment changes, resulting in agent customization processes which may be cumbersome or otherwise inhibit the user experience, such as by presenting customization questions to a user while the user is busy.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method a for updating a decision-making model of an electronic social agent by actively collecting at least a user response. The method comprises receiving an indication of an action that has been performed by the electronic social agent; collecting in near real-time at least a portion of a first dataset and at least a first user response with respect to the performed action, wherein the first dataset indicates at least a current state; determining based on the first dataset and the first user response, whether collection of at least a second user response is desirable; generating a question for collecting the at least a second user response; determining an optimal time for presenting the at least a question to the user; presenting, by the electronic social agent, the at least a question to the user at the determined optimal time; collecting, using at least one sensor the at least a second user response; and updating the decision-making model of the electronic social agent based on the collected at least a second user response.

In addition, certain embodiments disclosed herein include a system for customizing setup of features of an electronic device. The system comprises a processing circuitry; and a memory, the memory containing instructions that, when executed by the processing circuitry, configure the system to: collect in near real-time at least a portion of a first dataset and at least a first user response with respect to the performed action, wherein the first dataset indicates at least a current state; determine based on the first dataset and the first user response, whether collection of at least a second user response is desirable; generate a question for collecting the at least a second user response; determine an optimal time for presenting the at least a question to the user; present, by the electronic social agent, the at least a question to the user at the determined optimal time; collect, using at least one sensor the at least a second user response; and update the decision-making model of the electronic social agent based on the collected at least a second user response.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
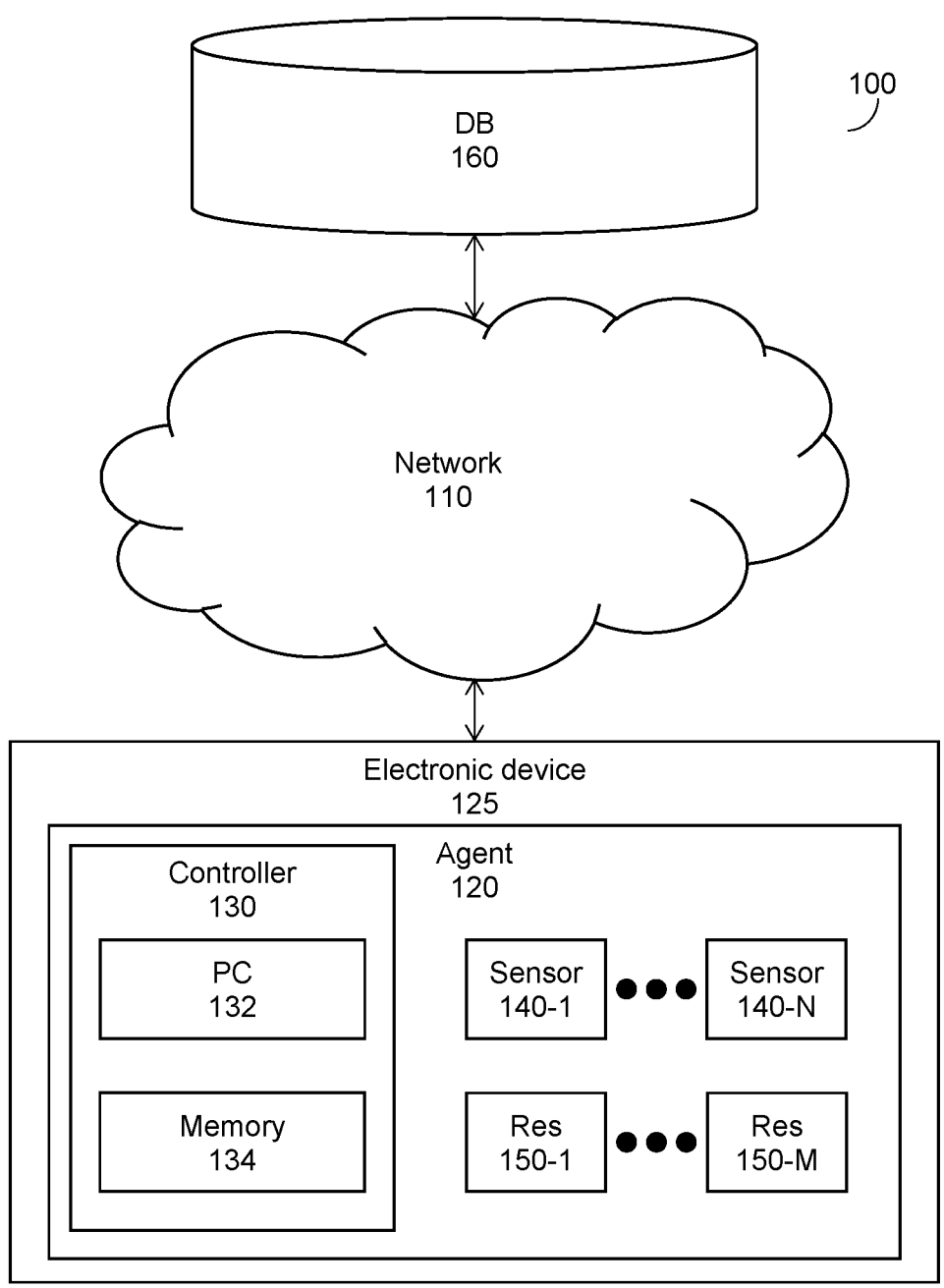
FIG. 1 is a network diagram of a system utilized for automatically updating a decision-making model of an electronic social agent by actively collecting at least a user response, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to some disclosed embodiments an action is performed by an electronic social agent. The electronic social agent collects a first dataset indicating the user's state, the user's environment state, and a first user response to the performed action. Then, it is determined whether it is desirable to collect a second response from the user and, if so, it is further determined whether to generate a question to be presented to the user based on an analysis of a first dataset and the first user response. Then, an optimal time for presenting the question to the user is determined. A question that is based on the collected data and the first user response is generated by the electronic social agent for actively collecting an additional user response. Then, based on the collected additional user response, the decision-making model of the electronic social agent is updated and improved.

FIG. 1 is an example network diagram of a system 100 utilized for automatically updating a decision-making model of an electronic social agent by actively collecting at least a user response, according to an embodiment. The system 100 includes an electronic social agent 120 and an electronic device 125. In some embodiments, the agent 120 is further connected to a network, where the network 110 is used to communicate between different parts of the system 100. The network 110 may be, but is not limited to, a local area network (LAN), a wide area network (WAN), a metro area network (MAN), the Internet, a wireless, cellular or wired network, and the like, and any combination thereof.

A user may access the electronic social agent 120 directly, e.g., via a voice command or an input device connected directly to the electronic social agent 120, or indirectly through the network 110, e.g., through an application on a mobile phone connected to the internet, where the electronic social agent 120 is additionally connected to the internet. Further, a user may access the electronic social agent 120 through the electronic device 125 in which the electronic social agent 120 resides. The agent 120 may include hardware, software, and the like, as well as any combination thereof. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause a processing circuitry to perform the various processes described herein.

In an embodiment, the electronic social agent 120 may be connected to, or implemented on, the electronic device 125. The electronic device 125 may be, for example and without limitation, a robot, a social robot, a service robot, a smart TV, a smartphone, a wearable device, a vehicle, a computer, a smart appliance, or the like.

The electronic social agent 120 includes a controller 130, explained in greater detail below in FIG. 2, having at least a processing circuitry 132 and a memory 134. The electronic social agent 120 may further include, or be connected to, one or more sensors 140-1 to 140-N, where N is an integer equal to or greater than 1 (hereinafter referred to as "sensor" 140 or "sensors" 140) and one or more resources 150-1 to 150-M, where M is an integer equal to or greater than 1 (hereinafter referred to as "resource" 150 or "resources" 150). The resources 150 may include, without limitation, display units, audio speakers, lighting systems, and the like, as well as any combination thereof. In an embodiment, the resources 150 may encompass sensors 140 as well.

The sensors 140 may include input devices, such as, without limitation, various sensors, detectors, microphones, touch sensors, movement detectors, cameras, and the like, as well as any combination thereof. Any of the sensors 140 may be, but are not necessarily, communicatively or otherwise connected to the controller 130 (such connection is not illustrated in FIG. 1 merely for the sake of simplicity and without limitation on the disclosed embodiments). The sensors 140 may be configured to sense signals received from one or more users, the environment of the user (or users), and the like, as well as any combination thereof. The sensors 140 may be positioned on or connected to the electronic device 125. In an embodiment, the sensors 140 may be implemented as virtual sensors that receive inputs from online services, e.g., a weather forecast.

The electronic social agent 120 is configured to use the controller 130, the sensors 140, and the resources 150, in order to automatically update a decision-making model of the electronic social agent 120 by actively collecting at least a user response, as further described hereinbelow. The decision-making model of the electronic social agent 120 may include one or more Artificial Intelligence (AI) algorithms that are utilized for determining the actions to be performed by the agent 120. The decision-making model of the electronic social agent 120 may be updated and improved using the disclosed system and method that allows an active and enhanced way for collecting rewards, i.e., user feedback, in response to actions made by the electronic social agent 120.

In one embodiment, the system 100 further includes a database 160. The database 160 may be stored within the electronic social agent 120 (e.g., within a storage device not shown), or may be separate from the electronic social agent 120 and connected thereto via the network 110. The database 160 may be utilized, for instance, for storing one or more plans (e.g., actions) to be executed by the agent 120, using the resources 150, as further discussed hereinbelow. The database 160 may further store therein historical data that is associated with one or more users. The historical data may be retrieved from the database 160 and used for determining, for example, the most effective way and time for communicating with a specific identified user for collecting the user's feedback to an action that has been performed by the electronic social agent 120.

Figure 2:
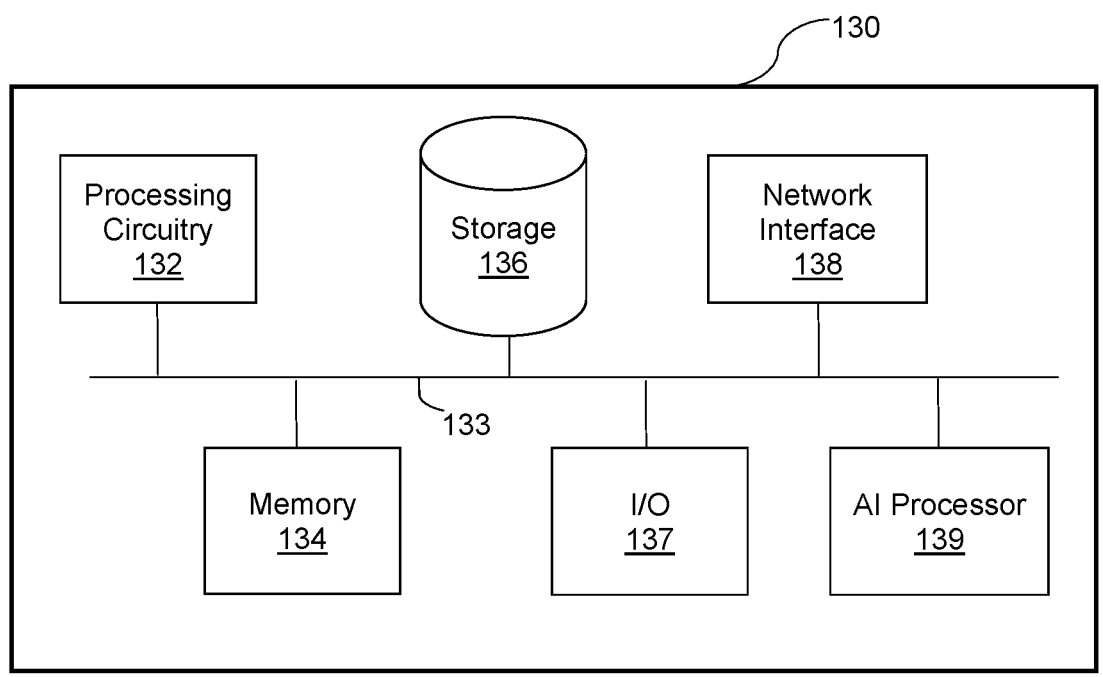
FIG. 2 is a block diagram of a controller, according to an embodiment.

FIG. 2 shows a schematic block diagram of a controller 130 of an agent, e.g., the electronic social agent 120 of FIG. 1, according to an embodiment. The controller 130 includes a processing circuitry 132 configured to receive data, analyze data, generate outputs, and the like, as further described hereinbelow. The processing circuitry 132 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 130 further includes a memory 134. The memory 134 may contain therein instructions that, when executed by the processing circuitry 132, cause the controller 130 to execute actions as further described herein below. The memory 134 may further store therein information, e.g., data associated with predetermined actions that may be executed by one or more resources, e.g., resources 150 of FIG. 1. As discussed above, the resources 150 include means by which the agent 120, interacts with at least one person (e.g., a user), collects data related to the person, and the like. The resources 150 may include, for example and without limitation, electro-mechanical elements, sensors, detectors, display units, speakers, microphones, touch sensors, light sensors, movement detectors, cameras, and so on as further described herein.

In one configuration, software for implementing one or more embodiments disclosed herein may be stored in the storage 136. In another configuration, the memory 134 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 132, cause the processing circuitry 810 to perform the various processes described herein.

The storage 136 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

In an embodiment, the controller 130 includes a network interface 138 configured to connect to a network, e.g., the network 110 of FIG. 1. The network interface 138 may include, but is not limited to, a wired interface (e.g., an Ethernet port) or a wireless port (e.g., an 802.11 compliant Wi-Fi card) configured to connect to a network (not shown).

The controller 130 further includes an input/output (I/O) interface 137 configured to control the resources 150 that are connected to the electronic social agent 120. In an embodiment, the I/O interface 137 is configured to receive one or more signals captured by sensors 140 of the agent 120 and send them to the processing circuitry 132 for analysis. According to one embodiment, the I/O interface 137 is configured to analyze the signals captured by the sensors 140, detectors, and the like. According to a further embodiment, the I/O interface 137 is configured to send one or more commands to one or more of the resources 150 for executing one or more plans (e.g., actions) of the electronic social agent 120. A plan may include, for example, an action such as generating a notification on a display unit of a social robot (not shown), suggesting going for a walk, turning down the volume of music being played by a sound system, and the like. According to a further embodiment, the components of the controller 130 are connected via a bus 133.

In an embodiment, the controller 130 further includes an artificial intelligence (AI) processor 139. The AI processor 139 may be realized as one or more hardware logic components and circuits, including graphics processing units (GPUs), tensor processing units (TPUs), neural processing units, vision processing units (VPU), reconfigurable field-programmable gate arrays (FPGA), and the like. The AI processor 139 is configured to perform, for example, machine learning based on sensory inputs received from the I/O interface 137, which receives input data, such as sensory inputs, from the sensors 140. In an embodiment, the AI processor 139 is further configured to determine, using one or more algorithms (e.g., machine learning algorithms), the current state of one or more users, the state of the environment around the user, and so on.

In an embodiment, the controller 130 is configured to receive an indication of an action that is currently performed or has been performed by the electronic social agent 120. Such an action may be, for instance, playing music, suggesting going for a walk, suggesting listening to a podcast, activating auto-pilot in a vehicle, and the like. The indication may be implemented as a notification that is automatically generated, once an action (e.g., a plan) is generated. The indication triggers the electronic social agent 120 to start an active collection of information, as further described hereinbelow.

In an embodiment, the controller 130 is configured to collect in real-time, or near real-time, at least a portion of a first dataset and a first user response with respect to the performed action. The first dataset indicates a current state. The current state reflects the state of the user and the state of the environment near the user, as further discussed hereinbelow. The data that is associated with the user may indicate whether, for example, the user is sleeping, reading, stressed, angry, and the like. The state of the environment refers to the circumstances sensed or otherwise acquired by the agent that are not directly related to the user. As a non-limiting example, the state of the environment may indicate that three persons are sitting in a vehicle next to the user, the vehicle is entering into a highway, it is Sunday, the time is 10 am, it is cloudy outside, the temperature outside the vehicle is 53 degrees Fahrenheit, the temperature within the cabin is 69 degrees Fahrenheit, and so on. As another non-limiting example, the state of the environment may indicate that one more person is located next to the user, that the user and the other person are at the user's kitchen, that the other person is identified as the user's wife, that it is Monday morning, that the time is 7 AM, that it is raining outside, and the like.

The first user response may indicate that the user is, for example and without limitation, accepting the action, refusing to accept the action, relating the action with a good or bad sentiment, and the like. That is, the electronic social agent 120 passively collects a reward, which is the first user response with respect to the action performed by the electronic social agent 120. The data indicating the first user response may be tagged and stored in a database, memory, and the like, for further usage, as further described hereinbelow. It should be noted that at least a portion of the first dataset is collected using one or more sensors, e.g., the sensors 140. As further discussed hereinabove, the sensors 140 may be communicatively connected to the electronic social agent 120. In an embodiment, the first dataset further includes historical data that is associated with the user or the environment. That is, the electronic social agent 120 may retrieve historical data of the user upon identification of the user. The historical data may include, for example, the user's preferences, how many times a reward was actively collected from the user in the last drive, when was the last time that user was alone in the car, and the like.

In an embodiment, the controller 130 is configured to apply at least one algorithm, (e.g., a machine learning algorithm) that may be based on a machine learning model, to at least a portion of the first dataset and to the first user response. The algorithm is applied for determining whether collection of at least a second user response is desirable with respect to the performed action. In an embodiment, the machine learning algorithm is further adapted to determine and generate at least a question that is used for collecting the at least a second user response, as further discussed hereinbelow. The second user response may be a verbal, such as a phrase or figure of speech, or non-verbal, such as facial expressions, tone of voice, and the like.

It should be noted that there may be several reasons for determining that collecting a second user response is desirable. For example, after an action is performed by the electronic social agent 120, if no user response is received, or a user response is received but does not provide a definite explanation, the decision importance is relatively high and therefore an accurate reward (e.g., a user response) is necessary. The determination may be achieved by, for example, analyzing at least a portion of the first dataset and the first user response. In an embodiment, a predetermined threshold may be used for determining whether it is desirable to collect a second user response with respect to the performed action.

The predetermined threshold may indicate a certainty level or a definite level of the first user response with respect to the performed action. Thus, if the certainty level is above the threshold, it may not be desirable to collect an additional feedback from the user, i.e., a second user response. It should be noted that although the certainty level may be below the threshold and, therefore, it may be desirable to collect a second user response, generating and presenting a question to the user may not occur due to the current state, user state, environment state, low decision importance level, and the like. That is, the controller 130 may be configured to prioritize the need to collect an additional reward, e.g., a second user response, and the need to not bother the user.

In an embodiment, upon determination that collection of a second user response is desirable, the controller 130 determines whether, at all, to generate a question to be presented to the user. The determination may be achieved based on applying the at least one algorithm to the collected first dataset (which indicates the current state) and to the first user response. That is, although it may be desirable to collect a second user response, when considering, for example, the importance level of the performed action, the value of the additional user response (i.e., reward), and the current state of the user and of the environment, it may be determined not to generate the question.

In an embodiment, the controller 130 is configured to determine using, for example, the algorithm (e.g., machine learning algorithm), an optimal time for presenting at least one question to the user. The optimal time may be the present moment, in an hour, tomorrow, at the next time the same action is performed by the electronic social agent 120, and the like. For example, although the first user response was indefinite and it is desirable to collect a second user response, it is determined that a question shall not be generated and presented to the user at the moment, because the user is not receptive at the moment. That is, it may be determined that a question shall not be generated at the moment, but it may be desirable to generate and present the question to the user upon fulfillment of several conditions in the future. Such conditions may be, for example and without limitation, whether more than one hour has passed since the last time a question has been presented to the user, whether the user is relaxed, whether the user is alone, and the like. That is, the controller 130 may be configured to prioritize the need to collect an additional reward, e.g., a second user response, and the need to not bother the user. In some cases, despite the need to generate and present a new question for collecting additional user response, a question will not be generated due to, for example, the state of the user.

According to another embodiment, the controller 130 may use the algorithm (e.g., machine learning model) for determining a specific point in time for presenting the question to the user. That is, even when it is determined that generation of the question is desirable, the timing of presenting the question may be crucial. For example, the question may not be presented immediately after determining that presenting the question is desirable, because the user is not receptive at the moment. As another example, it may be determined to present the question only at the next time the same action is performed by the electronic social agent 120. For example, an action is performed by the electronic social agent 120 and it is determined that generating a question for collecting a second user response is desirable. According to the same example, by applying one or more models, e.g., an unsupervised machine learning algorithm, the controller 130 determines that the best time to present the question to the user with respect to the performed action would be after it is determined that the user is alone, that the user is relaxed, that the time is after 7 PM, and the like. It should be noted that, in order to determine, for example, whether the user is relaxed, alone, or the like, the controller 130 may use one or more sensors (e.g., the sensors 140) that constantly collect sensor data. As a non-limiting example, the questions presented to the user by the electronic social agent 120 may be, "is this a bad time?," "would you like to perform this later?," and the like.

It should be noted that the objective of generating a question, to be presented to the user, is to actively collect a feedback, response, reward, etc. from the user with respect to the action that has been performed by the electronic social agent 120, when a second (additional) user response is desirable and the current state allows it, e.g., without bothering the user, when the user is relaxed, and the like. For example, the electronic social agent 120 collects data indicating that the vehicle the user is driving is entering the highway and activates the auto-pilot system of the vehicle. In response, the user says: "it was exactly what I needed". According to the same example, a first collected dataset indicates that two more people are sitting within the vehicle behind the user, that it is 7:45 am, and that three new electronic mails (e-mails) were just received at the user's smart phone. According to the same example, by applying a designated algorithm to the first dataset and to the user response, the controller 130 determines that it is desirable to generate a question for clarifying whether the user was sarcastic or not, what was the reason for accepting or rejecting the activation of the auto-pilot system, and the like. According to the same example, the algorithm may determine to present the question to the user only after the other two people get out of the vehicle and only after the user is no longer stressed. According to an embodiment, a closed-ended question may be generated based on historical data indicating that the user usually reacts in a negative manner when open-ended questions are presented to him or her.

In an embodiment, upon determination that collection of a second user response is desirable and that at least a question should be generated for collecting the second user response, the controller 130 determines and generates at least a question for collecting the second user response. The determination of the question is achieved using the machine learning algorithm that analyzes the first dataset and the first user response. In an embodiment, the controller 130 causes one or more electronic components (e.g., the resources 150) that are communicatively connected to, and controlled by, the electronic social agent 120, to present the question to the user. The question may be, for example: "Is that something you would not want me to offer?", "did you not want to listen to the podcast because of the children's presence?," and the like. The question may be presented to the user using one or more resources (e.g., the resources 150), such as, as examples and without limitation, speakers, display units, and the like, as well as any combination thereof. It should be noted that, upon determination that a second user response is not required, a question is not generated. That is, the received signals, i.e., sensor data, of the first user response to the performed action, were definite. In an embodiment, the controller 130 may be configured to update the decision-making model of the electronic social agent 120 based on the first user response to the performed action, upon determination that generation of the a question is not required.

In an embodiment, the controller 130 is configured to collect, using the one or more sensors (e.g., the sensors 140 of FIG. 1), at least a second user response with respect to the question. Collecting the second user response may include, for example and without limitation, using one or more cameras to collect expressions, using one or more microphones to collect audio signals, and the like, as well as any combination thereof. The second user response may include, without limitation, a word, a sentence, a gesture, a nod, and the like, as well as any combination thereof. The second user response may indicate whether the action that has been performed by the agent 120 was good or not, in the eyes of the user, and why. For example, although the user may not be satisfied with a suggestion, made by the agent 120, to play jazz music, at a specific point in time, there may be many reasons for the user's determination. According to the same example, a reason may be, as examples and without limitation, the presence of other people in the room or in a vehicle, the user's mood, a stressful environment that requires the user's attention, and the like. Thus, by collecting and analyzing the second user response, the controller 130 may be able to determine the exact reason that caused an action (that has been performed by the electronic social agent 120) to be positive or negative in the eyes of the user. The analysis of the collected second user response may be performed using, for example and without limitation, one or more computer vision techniques, audio signal processing techniques, machine learning techniques, and the like, as well as any combination thereof.

In an embodiment, the controller 130 is configured to update the decision-making model of the electronic social agent 120 based on the collected second user response. As further discussed herein, the decision-making model of the electronic social agent 120 may include one or more Artificial Intelligence (AI) algorithms that are utilized for determining the actions to be performed by the electronic social agent 120. That is, upon collecting the second user response, the controller 130 updates the reward signal and feeds the signal back to the decision-making model (e.g., algorithm) of the electronic social agent 120. The decision-making model of the electronic social agent 120 may be updated and improved using the disclosed system and method that allows an active and enhanced way for collecting rewards, i.e., user response (or feedback), in response to actions made by the agent 120. For example, the second user response may allow for determination that the user prefers listening to podcasts while driving in his or her vehicle, but only when the user is alone. Thus, the decision-making model may be updated accordingly and may suggest that the user listen to podcasts only when the user is alone.

It should be noted that at least one advantage of the disclosed system and method is that the process of collecting rewards, i.e., user responses, is performed actively by collecting and analyzing data of the user, including the user's response and state, which enables the determination of which questions to ask the user and when. Thus, even when an action has been performed a second ago, asking the user whether he or she was satisfied with the performed action may occur hours later, when, for example, certain people leave the room or vehicle, and the like. As further discussed hereinabove, the determined question is based on, without limitation, the first user response, the state of the user, and the state of the environment near the user. Thus, the generated question, if desirable, provides high-quality feedback from the user with respect to the performed action.

Figure 3:
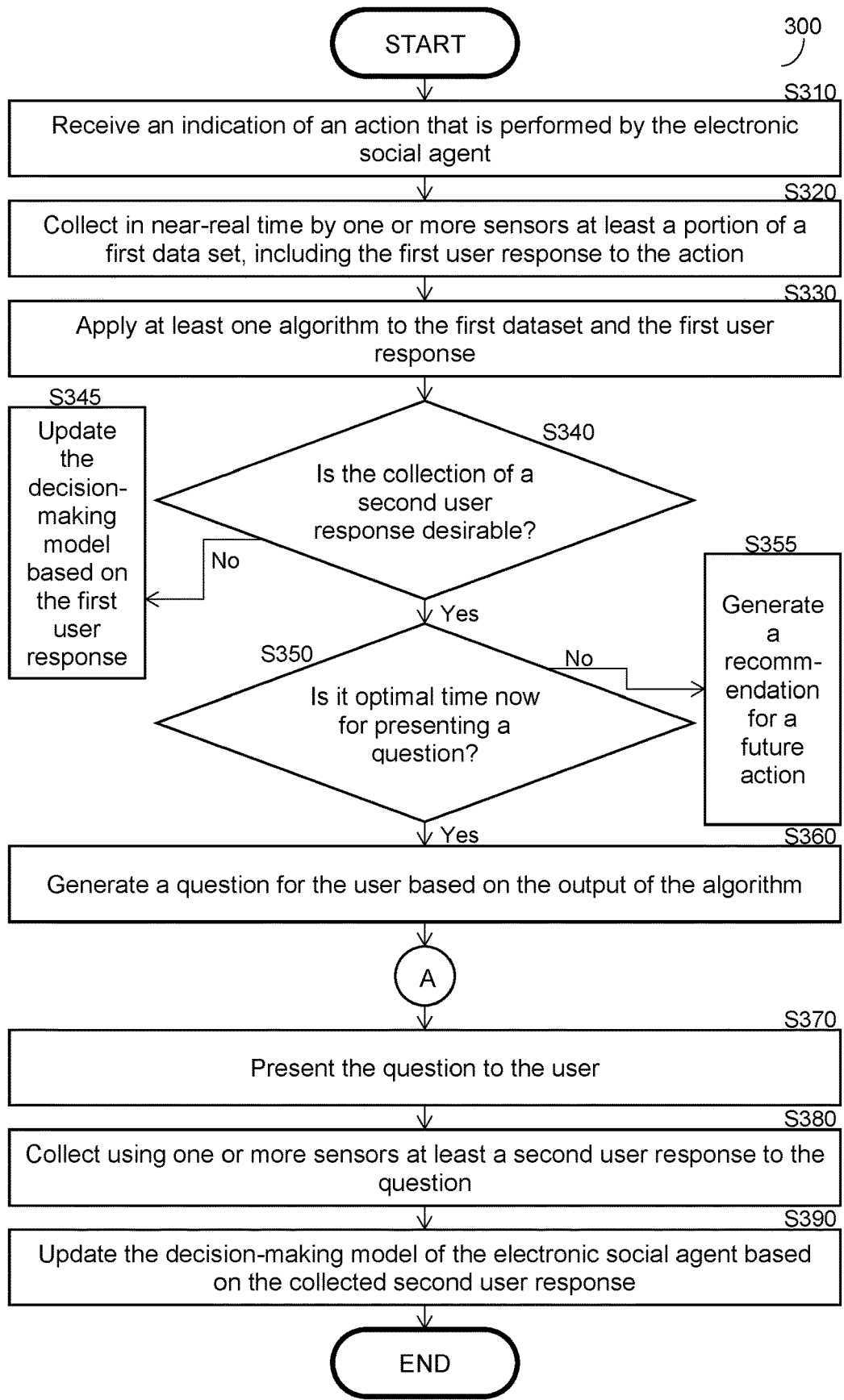
FIG. 3 is a flowchart illustrating of a method for automatically updating a decision-making model of an electronic social agent by actively collecting at least a user response, according to an embodiment.

FIG. 3 shows an example flowchart 300 of a method for automatically updating a decision-making model of an electronic social agent by actively collecting at least a user response. The method described herein may be executed by the controller 130 that is further described herein above with respect of FIG. 2.

At S310, an indication of an action that is performed by an electronic social agent (such as the agent 120), is received. The indication may be a notification that is automatically generated as an action is being executed.

At S320, a first dataset and a first user response are collected. The first dataset indicates a current state and the first user response refers to the user's reaction to the performed action, as further discussed hereinabove. The reaction of the user may be, as examples and without limitation, a verbal or non-verbal reaction such as facial expressions, tone of voice, figure of speech, and the like, as well as any combination thereof. The current state reflects the state of the user and the state of the environment near the user. It should be noted that at least a portion of the first dataset may be collected using one or more sensors (e.g., the sensors 140 that are shown in FIG. 1) that are communicatively connected to the electronic social agent 120.

At S330, a determination is made whether collection of a second user response is desirable. The determination may be made by, a machine learning model. In an embodiment, S330 further includes generating a question that is based on analysis of the first set of data and the first user response. Examples for such questions are provided above.

At S340, it is determined, after applying the machine learning model to the first dataset and to the collected user response, whether it is desirable to collect a second user response with respect to the performed action and, if so, execution continues with S350; otherwise, execution continues with S345.

At S345, upon determination that collection of a second user response is not desirable, the decision-making model of the electronic social agent 120 is updated with the first user response. That is, when the first user response is, for example, indefinite, collecting a second user response with respect to the performed action may be desirable.

At S350, upon determination that collection of a second user response is desirable, it is checked whether it is an optimal time for presenting a question to the user for collecting the second user response and, if so, execution continues with S360; otherwise, execution continues with S355. That is, although the collection of a second user response is desirable, it may not be optimal to ask the user to provide a second response at the moment due to, for example and without limitation, the user being not receptive at the moment, due to three questions having been presented to the user over the last 30 minutes such that presenting another question will bother the user, and the like.

At S355, upon determination that now is not an optimal time for presenting the user with a question, a recommendation for a future action is generated. The future action may be for example, generate and present a question to the user at the next time the same action is performed. According to an embodiment, when the same action is performed again, the electronic social agent 120 may use the decision-making model to decide whether to use the recommendation or not, considering the circumstances.

At S360, a question is generated by the algorithm based on the first dataset and the first user response. That is, the algorithm uses the first dataset and the user response as an input, and outputs a question for the user. The objective of determining and generating the question, to be presented to the user, is to actively collect a feedback (i.e. a reward) from the user with respect to the action that has been performed by the electronic social agent 120.

At S370, the generated question is presented to the user by the electronic social agent 120. The question may be presented to the user using one or more resources, e.g., the resources 150 of FIG. 1.

At S380, at least a second user response is collected with respect to the question. The second user response may be collected using one or more sensors, e.g., the sensors 140 shown in FIG. 1.

At S390, a decision-making model of the electronic social agent is updated based on the collected second user response.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for updating a decision-making model of an electronic social agent by actively collecting at least a user response, comprising:
   receiving an indication of an action that has been performed by the electronic social agent;
   collecting in near real-time at least a portion of a first dataset and at least a first user response with respect to the performed action, wherein the first dataset indicates at least a current state;
   applying at least one algorithm, wherein the at least one algorithm is a machine learning (ML) algorithm, to determine, based on the first dataset and the first user response, whether collection of at least a second user response is desirable;
   generating a question for collecting the at least a second user response;
   determining an optimal time for presenting the at least a question to the user;
   presenting, by the electronic social agent, the at least a question to the user at the determined optimal time;
   collecting, using at least one sensor the at least a second user response; and
   updating the decision-making model of the electronic social agent based on the collected at least a second user response.

2. The method of claim 1, wherein the current state is associated with a user and an environment of the user, wherein the at least a portion of the first dataset is collected using one or more sensors that are communicatively connected to the electronic social agent.

3. The method of claim 1, wherein the at least one algorithm is adapted to determine a point in time for presenting the question to the user upon determination that now is not the optimal time to generate the at least a question.

4. The method of claim 1, further comprising:
   updating the decision-making model of the electronic social agent based on the first user response, upon determination that generation of the question is not desirable.

5. The method of claim 1, wherein the first dataset further comprises a historical data of the user.

6. The method of claim 1, wherein the first dataset further comprises at least historical data about the environment.

7. The method of claim 2, wherein the one or more sensors are virtual sensors which receive inputs from online sources.

8. The method of claim 1, wherein determining whether the collection of at least a second user response is desirable further comprises:
applying a pre-determined threshold to determine whether it is desirable to collect a second user response.

9. The method of claim 1, wherein the at least a second user response is at least one of: a verbal response, and a non-verbal response.

10. A non-transitory computer readable medium having stored thereon instructions for causing a processing circuitry for updating a decision-making model of an electronic social agent by actively collecting at least a user response, the process comprising:
receiving an indication of an action that has been performed by the electronic social agent;
collecting in near real-time at least a portion of a first dataset and at least a first user response with respect to the performed action, wherein the first dataset indicates at least a current state;
applying at least one algorithm, wherein the at least one algorithm is a machine learning (ML) algorithm, to determine, based on the first dataset and the first user response, whether collection of at least a second user response is desirable;
generating a question for collecting the at least a second user response;
determining an optimal time for presenting the at least a question to the user;
presenting, by the electronic social agent, the at least a question to the user at the determined optimal time;
collecting, using at least one sensor the at least a second user response; and
updating the decision-making model of the electronic social agent based on the collected at least a second user response.

11. A system for updating a decision-making model of an electronic social agent by actively collecting at least a user response, comprising:
a processing circuitry; and
a memory, the memory containing instructions that, when executed by the processing circuitry, configure the system to:
receive an indication of an action that has been performed by the electronic social agent;
collect in near real-time at least a portion of a first dataset and at least a first user response with respect to the performed action, wherein the first dataset indicates at least a current state;
apply at least one algorithm, wherein the at least one algorithm is a machine learning (ML) algorithm, to determine, based on the first dataset and the first user response, whether collection of at least a second user response is desirable;
generate a question for collecting the at least a second user response;
determining an optimal time for presenting the at least a question to the user;
present, by the electronic social agent, the at least a question to the user at the determined optimal time;
collect, using at least one sensor the at least a second user response; and
update the decision-making model of the electronic social agent based on the collected at least a second user response.

12. The system of claim 11, wherein the current state is associated with a user and an environment of the user, wherein the at least a portion of the first dataset is collected using one or more sensors that are communicatively connected to the electronic social agent.

13. The system of claim 11, wherein the at least one algorithm is adapted to determine a point in time for presenting the question to the user upon determination that now is not the optimal time to generate the at least a question.

14. The system of claim 11, further comprising:
updating the decision-making model of the electronic social agent based on the first user response, upon determination that generation of the question is not desirable.

15. The system of claim 11, wherein the first dataset further comprises a historical data of the user.

16. The system of claim 11, wherein the first dataset further comprises at least historical data about the environment.

17. The system of claim 12, wherein the one or more sensors are virtual sensors which receive inputs from online sources.

18. The system of claim 11, wherein the system is further configured to:
apply a pre-determined threshold to determine whether it is desirable to collect a second user response.

* * * * *